United States Patent
Braun et al.

(10) Patent No.: US 12,516,235 B2
(45) Date of Patent: Jan. 6, 2026

(54) CEMENTITIOUS COMPOSITION COMPRISING A POLYMERIC MICRO-GEL AS AN ANTI-GAS MIGRATION AGENT

(71) Applicant: SNF Group, Andrezieux Boutheon (FR)

(72) Inventors: Olivier Braun, Andrezieux Boutheon (FR); Bruno Giovannetti, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 0 days.

(21) Appl. No.: 18/862,449

(22) PCT Filed: May 2, 2023

(86) PCT No.: PCT/EP2023/061573
§ 371 (c)(1),
(2) Date: Nov. 1, 2024

(87) PCT Pub. No.: WO2023/213825
PCT Pub. Date: Nov. 9, 2023

(65) Prior Publication Data
US 2025/0115802 A1 Apr. 10, 2025

(30) Foreign Application Priority Data
May 3, 2022 (FR) ........................ 2204194

(51) Int. Cl.
| | | |
|---|---|---|
| E21B 33/14 | (2006.01) | |
| C04B 24/16 | (2006.01) | |
| C08F 220/58 | (2006.01) | |
| C09K 8/467 | (2006.01) | |
| C04B 103/00 | (2006.01) | |

(52) U.S. Cl.
CPC ........... *C09K 8/467* (2013.01); *C04B 24/163* (2013.01); *C08F 220/585* (2020.02); *E21B 33/14* (2013.01); *C04B 2103/0051* (2013.01); *C04B 2103/0062* (2013.01); *C08F 2810/20* (2013.01)

(58) Field of Classification Search
CPC .............................. C09K 8/467; E21B 33/14
USPC ......................................................... 166/292
See application file for complete search history.

(56) References Cited

U.S. PATENT DOCUMENTS

| | | |
|---|---|---|
| 4,151,150 A | 4/1979 | Peters et al. |
| 4,537,918 A | 8/1985 | Parcevaux et al. |
| 4,569,395 A | 2/1986 | Carpenter |
| 10,759,746 B2 | 9/2020 | Favero et al. |
| 2009/0260820 A1* | 10/2009 | Kurian .................... C09K 8/588 507/225 |
| 2009/0264322 A1* | 10/2009 | Morris .................... C09K 8/588 507/224 |
| 2015/0203402 A1* | 7/2015 | Ko ......................... C04B 24/163 526/287 |
| 2020/0199443 A1* | 6/2020 | Zhou ....................... C09K 8/88 |
| 2022/0127523 A1* | 4/2022 | Lin ......................... C09K 8/035 |

FOREIGN PATENT DOCUMENTS

| | | |
|---|---|---|
| EP | 2802936 A1 | 11/2014 |
| EP | 4294776 B1 | 6/2024 |
| FR | 2704219 A1 | 10/1994 |
| FR | 3104578 A1 | 6/2021 |
| WO | 01/05365 A1 | 1/2001 |
| WO | 2004/101952 A1 | 11/2004 |
| WO | 2012/150431 A1 | 11/2012 |
| WO | 2016162532 A1 | 10/2016 |
| WO | 2018/185037 A1 | 10/2018 |

OTHER PUBLICATIONS

International Search Report and Written Opinion of the International Searching Authority for PCT/EP2023/061573, mailed on Jul. 7, 2023.

\* cited by examiner

*Primary Examiner* — William D Hutton, Jr.
*Assistant Examiner* — Ashish K Varma
(74) *Attorney, Agent, or Firm* — HESLIN ROTHENBERG FARLEY & MESITI P.C.

(57) ABSTRACT

The present invention concerns the technical field of cementing, in particular in the construction of oil and/or gas wells or geothermal energy. More specifically, the subject of the present invention is a cementitious composition and an improved method of cementing by means of the introduction into the cement of a polymeric micro-gel as an anti-gas migration agent.

17 Claims, No Drawings

CEMENTITIOUS COMPOSITION COMPRISING A POLYMERIC MICRO-GEL AS AN ANTI-GAS MIGRATION AGENT

CROSS REFERENCE TO RELATED APPLICATIONS

This application is a national stage filing under section 371 of International Application No. PCT/EP2023/061573 filed on May 2, 2023, and published on Nov. 9, 2023 as WO 2023/213825, which claims priority to French Application No. 2204194, filed on May 3, 2022. The entire contents of WO 2023/213825 are hereby incorporated herein by reference.

TECHNICAL FIELD OF THE INVENTION

The present invention relates to the technical field of cementing, in particular in the construction of oil and/or gas wells or geothermal energy. More specifically, the subject of the present invention is a cementitious composition and an improved method of cementing by means of the introduction into the cement slurry of a polymeric micro-gel as an anti-gas migration agent.

STATE OF THE PRIOR ART

Well cementing involves pumping a cement slurry from the surface down a casing so that the cement slurry returns to the surface via the annular space between the casing and the borehole. One of the objectives of cementing a well is to isolate the different layers of underground formation traversed by the drilling in order to prevent the migration of fluids (liquid or gaseous) between the different geological layers or between the layers and the surface. In particular, it is essential from a safety point of view to prevent any gas from rising through the annular space between the wall of the well (borehole) and the casing.

During the cementing phase, the pressurized gases that are under the surface of the earth can migrate through the various layers of formation crossed by the drilling and the cement. This is a critical phase which lasts several hours during which the cement slurry no longer behaves like a liquid but does not yet behave like an impermeable solid. This phenomenon occurs when the cement slurry reaches a degree of setting such that the hydrostatic pressure of the cement column is no longer sufficient to prevent pressurized gas pockets from propagating through the slurry. The gas can then circulate in the cement column during setting, creating multiple channels in the cement that can reach the surface. This movement of gases can cause loss of pressure control or even cause an explosion, which is why the industry has developed a series of additives intended to maintain gas leak-tightness throughout the cement setting period.

Among these additives are latexes, such as natural rubber latex. Such additives have been commonly used since the 1920s in Portland cements, in particular due to the improvement in the mechanical performance of cement. A decisive improvement took place in the 1980s when Parcevaux et al. identified styrene-butadiene rubber as an effective additive to prevent ring gas migration. This technology is in particular described in document U.S. Pat. No. 4,537,918 which discloses slag cement compositions inhibiting the escape of gases under pressure in the cemented ring, even at high temperature using styrene-butadiene rubber.

WO 2012/150431 teaches a cementing fluid comprising a polymeric suspending agent that can be prepared by inverse suspension polymerization, optionally in inverse emulsion.

WO 2004/101952 describes a composition for cementing wells.

US 2015/203402 describes a polycarboxylic copolymer additive for a cement composition.

WO 01/05365 describes a composition comprising monomer fractions of a water-soluble branched or cross-linked ampholyte polymer.

WO 2018/185037 describes a composition and its use as an agent for controlling filtrate and/or gas migration in a fluid injected under pressure into an underground formation.

Although additives based on styrene-butadiene rubber are the most frequently used additives to prevent gas migration, these products, although effective, require high concentrations and are relatively expensive. In addition, some require the use of stabilizing agents in order to prevent the coagulation thereof in the cement, as specified in documents U.S. Pat. Nos. 4,537,918 and 4,151,150.

Document FR 2 704 219 describes a type of fluid loss control agent, with anti-gas migration properties, for oil industry fluids, in particular for cement slurries. Such fluid loss control agents consist of polymers obtained by chemical crosslinking of a polyvinyl alcohol (PVA).

These fluid loss control agents are water-soluble polymers and the effectiveness thereof is generally limited because some cannot be used at high concentrations due to high slag viscosities at the mixing stage. The effectiveness of these additives is limited in terms of reproducibility, performance and stability, especially at temperatures above 50° C.

Document U.S. Pat. No. 4,569,395 proposes adding a cellulose derivative (e.g. hydroxyethyl cellulose) to the cement to allow the use of PVA at temperatures ranging up to 95° C.

The formation of gas channels is a very serious problem because this leads to embrittlement of the cement and problems related to safety at the surface.

The number of attempts to solve this problem is indicative of its seriousness and has remained a major concern for manufacturers for many years.

There are still needs for additives that are more effective in making a cement leak-tight during the setting thereof, and remaining usable regardless of the temperature conditions and requiring no additional additive.

The Applicant has discovered, surprisingly, that the use of specific micro-gels allows the cements to have superior anti-gas migration properties compared to the products conventionally used. The micro-gels of the invention exhibit good performance whatever the temperature conditions, and require a much lower dosage than the solutions of the prior art.

The use of the cementitious composition according to the invention is part of a general principle of improving the performance of products and more particularly of the anti-gas migration agent properties. The better performance of the polymeric micro-gels according to the invention make it possible to reduce the quantity of product necessary for the application, which therefore implies a reduction in the release of greenhouse gases, such as $CO_2$, associated with the manufacture and the use of synthetic polymers.

DISCLOSURE OF THE INVENTION

The present invention relates to a cementitious composition comprising:

A cement;

Optionally at least one cementing additive;
A polymeric micro-gel;
Water.

The cementitious composition can consist of these compounds.

In this cementitious composition, the polymeric micro-gel comprises at least one polymer structured by at least one crosslinking agent. The structured polymer is obtained by polymerization of at least one monomer in inverse emulsion (water-in-oil emulsion).

The present invention also relates to a cementing process comprising the underground injection of a cementitious composition containing a polymeric micro-gel comprising at least one structured polymer, said structured polymer being obtained by inverse emulsion.

DESCRIPTION OF THE INVENTION

According to the invention, the term "anti-gas migration agent" denotes an additive capable of limiting the migration of gas during the setting of the cement.

In general, a fluid loss control agent makes it possible to limit the loss of liquid fluid during the fluid loss phase of the cementing, e.g. the loss of water in contact with a porous zone such as an underground clay formation.

In the literature, the effectiveness of an anti-gas migration agent has been measured in the same way as that of a fluid loss control agent. Thus, it can be wrongly considered that a fluid loss control agent has anti-gas migration properties. However, while it is true that an anti-gas migration agent will have the effect of limiting fluid loss, a fluid loss control agent will not necessarily have an effect on gas migration. Thus, measuring the effectiveness of an anti-gas migration agent by measuring the loss of fluid does not allow the effectiveness of an anti-gas migration agent to be assessed.

In order to determine the effectiveness of an anti-gas migration agent, a Static Gel Strength Analyzer (SGSA) is used. This device measures the static gel strength (SGS) of cement under high temperature and high pressure conditions. The instrument is equipped with an internal processor board that sends and receives an ultrasonic pulse through the slurry and then performs post-processing of the data to determine gel strength in a static medium as a function of time.

Once static, the cement slurry develops a gel strength which results in a loss of hydrostatic pressure (pressure exerted by the cement slurry on the walls of the well (borehole) and casing). When the hydrostatic pressure is lower than the pore pressure of the drilling zone, gas can infiltrate and migrate to a lower pressure zone, potentially to the surface. During a transition period, the cement slurry is no longer a liquid capable of transmitting hydrostatic pressure and is not yet a solid. The cement slurry then has the structure of a gel. The value of the gel strength below which the hydrostatic pressure becomes lower than the pore pressure is called the Critical Static Gel Strength (CSGS). The value of the gel strength above which the gas cannot migrate through the cement is considered, as a precaution, to be 239 Pa (500 lb/100 ft$^2$). Thus, in general, the transition period between the CSGS and 239 Pa must be as short as possible to avoid a risk of gas migration. From a regulatory and safety point of view, it is considered that this transition period must be less than 45 minutes. It is considered that the gelation of a slurry begins when the CSGS is at least 100 lb/100 ft$^2$ (100 lb/100 ft$^2$=0.4788 Pa) while the end of the risk of gas migration is reached when the CSGS is at least 500 lb/100 ft$^2$. A person skilled in the art is familiar with conventional measuring devices and methods. If necessary, a person skilled in the art may refer to the document "*Fluid Chemistry Drilling and Completion*", Volume 1, Chapter 5.

The term "polymer refers to a homopolymer or a copolymer, wherein a copolymer refers to a polymer prepared from at least two different monomers. It can therefore be a copolymer of at least two monomers chosen from anionic monomers, cationic monomers, nonionic monomers, zwitterion type monomers and mixtures thereof.

By "polymeric micro-gel", is meant a micro-gel as described in the document "*Polymer Networks*", Chapter 8, p. 227-275. Such polymers are structured polymers of roughly spherical shape with dimensions on the order of the size of the molecules of linear polymers or branched polymers. Micro-gels are microscopic networks the properties of which depend on the crosslinking density thereof, the connectivity thereof, the presence of solvent, etc. Micro-gels are polymer particles that are not soluble in their medium.

By "X and/or Y", is meant according to the invention "X", or "Y", or "X and Y".

Also part of the invention are all the possible combinations between the various embodiments disclosed, whether these are preferred embodiments or given by way of example. Furthermore, when ranges of values are indicated, the limits are part of these ranges. The disclosure also comprises all combinations between the limits of these ranges of values. For example, the ranges of values 1-20, preferably 5-15, imply the disclosure of the ranges "1-5", "1-15", "5-20" and "15-20" and the values 1, 5, 15 and 20 The process according to the invention allows cements of better quality to be obtained by means of a selection on the method of preparation of the polymeric micro-gel and the chemistry of said polymeric micro-gel.

Composition

The present invention relates to a cementitious composition comprising:
A cement;
Optionally at least one cementing additive;
A polymeric micro-gel;
Water.

In this cementitious composition, the polymeric micro-gel comprises at least one structured polymer. The structured polymer is obtained by polymerization of monomer(s) in inverse emulsion.

The cement is advantageously chosen from mixtures based on lime; silica; alumina; calcium sulfate; Portland cement; pozzolanic materials, such as ground slag and fly ash, and mixtures thereof.

The cementing additive is generally chosen from the additives commonly used in the field of application, comprising, but not limited to, dispersants, anti-loss of fluid agents, retarders and mixtures thereof.

In general, the cementitious composition advantageously comprises between 100 and 100,000 ppm by weight of polymeric micro-gel, relative to the total weight of the cementitious composition, preferably between 500 and 50,000 ppm, even more preferably 500 and 10,000 ppm.

The present invention also relates to the use, to form a cementitious composition, of a polymeric micro-gel comprising at least one polymer structured by at least one crosslinking agent, wherein the structured polymer is obtained by inverse emulsion polymerization of at least one monomer.

The present invention also relates to a process for the preparation of a cementitious composition, comprising the mixture of the following compounds:
a polymeric micro-gel;

a cement;
water;
optionally at least one cementing additive;
the polymeric micro-gel comprising at least one polymer structured by at least one crosslinking agent,
wherein the structured polymer is obtained by inverse emulsion polymerization of at least one monomer.

Polymeric Micro-Gel

The polymeric micro-gel is a synthetic polymeric micro-gel. Preferably, it contains a structured polymer obtained by polymerization of at least one anionic monomer and/or of at least one nonionic monomer and/or of at least one cationic monomer and/or of at least one zwitterionic monomer and/or at least one hydrophobic monomer. Preferably, these monomers have unsaturated olefin type bonds (double bonds between two carbon atoms).

In a preferred embodiment, the polymeric micro-gel comprises at least one anionic monomer and optionally at least one nonionic monomer.

Advantageously, the other anionic monomer or monomers that can be used within the scope of the invention can be chosen from a large group. These monomers can have a functional vinyl group, in particular acrylic, maleic, fumaric, malonic, itaconic, or allylic. The monomers may also contain a carboxylate, phosphonate, phosphate, sulfonate, or other anionically charged group. Preferred monomers belonging to this class are, e.g. acrylic acid, methacrylic acid, itaconic acid, crotonic acid, maleic acid, fumaric acid, acrylamido undecanoic acid, 3-acrylamido 3-methylbutanoic acid, maleic anhydride, 2-acrylamido-2-methylpropane sulfonic acid (ATBS), vinylsulfonic acid, vinylphosphonic acid, allylsulfonic acid, methallylsulfonic acid, 2-sulfoethylmethacrylate, sulfopropylmethacrylate, sulfopropylacrylate, allylphosphonic acid, styrenesulfonic acid, 2-acrylamido-2-methylpropanedisulfonic acid, the salts and the mixtures thereof. Preferably, it is 2-acrylamido-2-methylpropane sulfonic acid (ATBS) and/or the salts thereof.

In a special embodiment of the invention, the anionic monomer(s) can be salified (salts).

By salified is meant that at least one acid functional group of the anionic monomer is replaced by a salt neutralizing the negative charge of the acid functional group. In other words, the non-salified form corresponds to the acid form of the monomer, e.g. R—C(=O)—OH in the case of the carboxylic acid functional group, whereas the neutralized form of the monomer corresponds to the R—C(=O)—O—X$^+$ form, wherein X$^+$ corresponds to a salt with a positive charge. The neutralization of the acid functional groups of the polymeric micro-gel can be partial or total.

The salified form advantageously corresponds to the salts of alkali metals (Li, Na, K, etc.), of alkaline-earth metals (Ca, Mg, etc.) or of ammonium (e.g. ammonium ion or a tertiary ammonium). Preferred salts are sodium salts.

The salification can take place before, during or after the polymerization.

The polymeric micro-gel advantageously comprises between 0 and 100 mol % of anionic monomers, preferably between 20 and 100 mol %, more preferably between 40 and 100 mol % and even more preferably between 50 and 100 mol %.

The polymeric micro-gel advantageously comprises at least 30 mol % of anionic monomers, more preferably at least 50 mol %, more preferably at least 70 mol %, even more preferably at least 90 mol % and even more preferably it contains only anionic monomers. The polymeric micro-gel can therefore advantageously be a polymer of at least one anionic monomer in acid and/or salified form.

In a special embodiment of the invention, the polymeric micro-gel advantageously comprises between 0 and 100 mol % of anionic monomers in salified form, preferably between 0 and 50 mol %.

In a special embodiment of the invention, when the anionic monomer is 2-acrylamido-2-methylpropane sulfonic acid, it is in its hydrated form. The hydrated form of 2-acrylamido-2-methylpropane sulfonic acid is a specific form of 2-acrylamido-2-methylpropane sulfonic acid which can be obtained by controlled crystallization of 2-acrylamido-2-methylpropane sulfonic acid monomer. U.S. Pat. No. 10,759,746 describes the hydrated form of 2-acrylamido-2-methylpropane sulfonic acid.

Advantageously, the nonionic monomer(s) which can be used within the framework of the invention are chosen from the group which comprises acrylamide, methacrylamide, N-isopropylacrylamide, N,N-dimethylacrylamide, N,N-diethylacrylamide N-methylolacrylamide, N-vinylformamide (NVF), N-vinyl acetamide, N-vinylpyridine and N-vinylpyrrolidone (NVP), N-vinyl imidazole, N-vinyl caprolactam, N-vinyl succinimide, acryloyl morpholine (ACMO), acryloyl chloride, glycidyl methacrylate, glyceryl methacrylate, diacetone acrylamide, hydroxyalkyl (meth)acrylates ($C_1$-$C_3$alkyl), aminoalkyl (meth)acrylate ($C_1$-$C_3$alkyl), thioalkyl (meth)acrylate ($C_1$-$C_3$alkyl) and mixtures thereof. Preferably, acrylamide would be used.

The polymeric micro-gel advantageously comprises between 0 and 100 mol % of non-ionic monomers, preferably between 0 and 80 mol %, more preferably between 0 and 60 mol % and even more preferably between 0 and 50 mol %.

The polymeric micro-gel advantageously comprises less than 70 mol % of non-ionic monomers, preferably less than 50 mol %, more preferably less than 30 mol % and even more preferably less than 10 mol %.

Advantageously, the cationic monomer(s) which can be used within the framework of the invention can be chosen, in particular from monomers of the vinyl type, in particular acrylamide, acrylic, allylic or maleic having an ammonium functional group, advantageously quaternary ammonium. Preferred monomers belonging to this class are, e.g., quaternized dimethylaminoethyl acrylate (DMAEA), quaternized dimethylaminoethyl methacrylate (DEAEMA), dimethyldiallylammonium chloride (DADMAC), acrylamido propyltrimethyl ammonium chloride (APTAC), and methacrylamido propyltrimethyl ammonium chloride (MAPTAC) and mixtures thereof.

The polymeric micro-gel advantageously comprises between 0 and 100 mol % of cationic monomers, preferably between 0 and 80 mol %, more preferably between 0 and 60 mol % and even more preferably between 0 and 50 mol % The polymeric micro-gel advantageously comprises less than 70 mol % of cationic monomers, preferably less than 50 mol %, more preferably less than 30 mol % and even more preferably less than 10 mol %.

A person skilled in the art will know how to prepare the quaternized monomers, e.g. by means of alkyl halide of the R—X type, wherein R is an alkyl group (advantageously in $C_1$-$C_3$) and X is a halogen (in particular methyl chloride). Furthermore, the present invention also covers monomers of the DADMAC, APTAC and MAPTAC type, the halide counterion of which is fluoride, bromide or iodide instead of chloride.

Advantageously, the zwitterion monomer(s) that can be used within the framework of the invention can be derived from a unit of the vinyl type, in particular acrylamide, acrylic, allylic or maleic, this monomer having an amine or ammonium functional group (advantageously quaternary) and an acid functional group of the carboxylic (or carboxylate), sulfonic (or sulfonate) or phosphoric (or phosphate) type and mixtures thereof. Examples of zwitterion monomers are, e.g., dimethylaminoethyl acrylate derivatives, such as 2-((2-9(acryloyloxy)ethyl)dimethylammonio)ethane-1-sulfonate, can comprise in particular but are not limited to, 3-((2-(acryloyloxy)ethyl)dimethylammonio)propane-1-sulfonate, 4-((2-(acryloyloxy)ethyl)dimethylammonio)butane-1-sulfonate, [2-(acryloyloxy)ethyl](dimethylammonio) acetate, dimethylaminoethyl methacrylate derivatives such as 2-((2-(methacryloyloxy)ethyl)dimethylammonio)ethane-1-sulfonate, 3-((2-(methacryloyloxy)ethyl)dimethylammonio)propane-1-sulfonate, 4-((2-(methacryloyloxy)ethyl)dimethylammonio)butane-1-sulfonate, [2-(methacryloyloxy)ethyl](dimethylammonio)acetate, propylacrylamide dimethylamino derivatives such as 2-((3-acrylamidopropyl)dimethylammonio)ethane-1-sulfonate, 3-((3-acrylamidopropyl)dimethylammonio)propane-1-sulfonate, 4-((3-acrylamidopropyl)dimethylammonio)butane-1-sulfonate, [3-(acryloyl)oxy)propyl](dimethylammonio)acetate, dimethylamino propyl methylacrylamide, or derivatives such as 2-((3-methacrylamidopropyl)dimethylammonio)ethane-1-sulfonate, 3-((3-me dimethylammonio) propane-1-sulfonate 4-((3-methacrylamidopropyl)dimethylammonio)butane-1-sulfonate and propyl[3-(methacryloyloxy)](dimethylammonio)acetate and the mixtures thereof. Examples of zwitterion monomers that can be used are also described in document FR3104578.

Advantageously, the monomer or monomers exhibiting a hydrophobic character which can be used in the context of the invention can be chosen from the groups consisting of esters of (meth)acrylic acid having a $C_4$-$C_{30}$alkyl chain, arylalkyl ($C_4$-$C_{30}$alkyl, $C_4$-$C_{30}$aryl), propoxylated, ethoxylated, or ethoxylated and propoxylated; (meth)acrylamide derivatives having a $C_4$-$C_{30}$alkyl, propoxylated arylalkyl ($C_4$-$C_{30}$alkyl, $C_4$-$C_{30}$aryl), ethoxylated, ethoxylated and propoxylated, or di$C_4$-$C_{30}$; alkyl aryl sulfonates ($C_4$-$C_{30}$alkyl, $C_4$-$C_{30}$aryl), or by mono- or di-substituted amides of (meth)acrylamide having a $C_4$-$C_{30}$alkyl chain, arylalkyl (alkyl $C_4$-$C_{30}$, $C_4$-$C_{30}$aryl), propoxylated, ethoxylated, or ethoxylated and propoxylated; (meth)acrylamide derivatives having a $C_4$-$C_{30}$alkyl, propoxylated arylalkyl ($C_4$-$C_{30}$alkyl, $C_4$-$C_{30}$aryl), ethoxylated, ethoxylated and propoxylated, or $C_4$-$C_{30}$dialkyl chain; alkyl aryl sulfonates ($C_4$-$C_{30}$alkyl, $C_4$-$C_{30}$aryl) and mixtures thereof. In general, the aryl groups are advantageously $C_5$-$C_{30}$ or $C_6$-$C_{30}$.

The polymeric micro-gel advantageously comprises less than 10 mol % of hydrophobic monomers.

In a special embodiment of the invention, the polymeric micro-gel can comprise at least one heat-sensitive monomer. By heat-sensitive monomer is meant monomers which change the physical properties of the polymer as a function of temperature. Mention may be made, e.g., of the groups at a Lower Critical Solution Temperature (LCST), e.g. an LCST macromonomer, the groups at an Upper Critical Solution Temperature (UCST), e.g. a UCST macromonomer. A person skilled in the art knows these types of monomers which are known and conventional with regard to the general knowledge in the art and if necessary the person skilled in the art can consult document WO2016162532.

The amounts of the various monomer(s) will be adjusted by a person skilled in the art so as not to exceed 100 mol % during the preparation of the polymeric micro-gel.

The polymeric micro-gel is structured by at least one crosslinking agent. This crosslinking agent is advantageously chosen from the group which comprises polyethylene type unsaturated monomers (which have at least two unsaturated functional groups), such as e.g. vinyl, in particular allyl type, acryl type functional groups, or from monomers which have at least two epoxy functional groups. Mention may be made, e.g., of methylene bis acrylamide (MBA), triallyamine, tetraallylammonium chloride, 1,2 dihydroxyethylene bis-(N-acrylamide) or (meth)acrylates having several functional groups, such as poly(meth)acrylates (ethylene glycol) (PEG di(meth)acrylate). Preferably, methylene bis acrylamide would be used.

The amount of crosslinking agent is advantageously less than 5%, by weight relative to the weight of monomer(s), preferably less than 1%, more preferably less than 0.5%, and even more preferably less than 0.3%. According to a special embodiment, this is advantageously at least equal to 0.005%, by weight relative to the weight of monomer(s), more preferably at least equal to 0.01%, and even more preferably at least equal to 0.05%.

As already indicated, the structured polymer is obtained by inverse emulsion. The formation of the structured polymer in the hydrophilic phase droplet containing the monomers leads to the production of a polymeric micro-gel.

Inverse Emulsion

An emulsion consists of a turbid, two-phase medium. The emulsion may be unstable in the absence of a surfactant (surfactants comprise emulsifying agents of the water-in-oil type and oil-in-water emulsifying agents). Under stirring, particles are observed, which are dispersed in water or in oil accordingly, and same have a broad size distribution around a mean value which may be on the order of a micrometer. During emulsion polymerization, the monomer is dispersed in the large emulsion droplets (diameter: approximately 1 µm to 10 µm) as well as in the small emulsifier micelles (diameter approximately 5 to 10 nm).

This polymerization technique, in particular in inverse emulsion, is well known to a person skilled in the art. It consists of emulsifying a hydrophilic phase which comprises the monomer(s) and the crosslinking agent(s) in a lipophilic phase. This emulsification is done using a water-in-oil emulsifier.

An inverse emulsion generally comprises at least:
- a hydrophilic phase which comprises the monomer(s) and the crosslinker(s);
- a lipophilic phase;
- at least one emulsifying agent of the water-in-oil type;
- at least one oil-in-water type emulsifying agent.

An inverse emulsion comprises droplets (hydrophilic phase) dispersed in the lipophilic phase.

In the present invention, the term "water-in-oil type emulsifier" means a compound capable of emulsifying water in an oil and an "oil-in-water type emulsifier" is a compound capable of emulsifying an oil in water. Generally, it is considered that an emulsifying agent of the water-in-oil type is a surfactant with an HLB (Hydrophilic-Lipophilic Balance) strictly less than 8, and that an oil-in-water emulsifying agent is a surfactant with an HLB greater than or equal to 10. A surfactant with an HLB between 8 and 10 is considered a wetting agent. A person skilled in the art should refer to the document "*Handbook of Applied Surface and Colloid Chemistry*" by K. Holmberg, Chapter 11, if necessary.

The Hydrophilic-Lipophilic Balance (HLB) of a chemical compound is a measure of the hydrophilic and/or lipophilic properties thereof, as determined by calculating the values for the different segments of the molecule, as described by Griffin in 1949.

In the present invention, we have adopted Griffin's method which is based on calculating a value based on the chemical groups of the molecule. Griffin assigned a dimensionless number between 0 and 20 to give information about water and oil solubility.

The HLB value of a substance having a total molecular weight M and a hydrophilic part of a molecular weight Mh is given by:

$$HLB=20(Mh/M)$$

The lipophilic phase of the inverse emulsion can comprise a mineral oil, a vegetable oil, a synthetic oil or a mixture of several of these oils.

Examples of mineral oil are mineral oils containing saturated hydrocarbons of the aliphatic, naphthenic, paraffinic, isoparaffinic, cycloparaffinic or naphthyl type.

Examples of synthetic oil are hydrogenated polydecene or hydrogenated polyisobutene, esters such as octyl stearate or butyl oleate. Exxon's Exxsol® product line is a perfect fit.

The solvent for the hydrophilic phase of the inverse emulsion is advantageously water.

Generally, the inverse emulsion has, during the polymerization, a weight ratio between the hydrophilic phase and the lipophilic phase preferably between 50/50 and 90/10, more preferably between 70/30 and 80/20.

Advantageously, the inverse emulsion contains at least one emulsifying agent of the water-in-oil type chosen from the following list: sorbitan extracts, such as sorbitan monooleate or sorbitan polyoleates, sorbitan isostearate or sorbitan sesquioleate, polyethoxylated sorbitan esters, diethoxylated oleocetyl alcohol, tetraethoxylated lauryl acrylate, condensation products of fatty alcohols higher than ethylene (such as the reaction product of oleyl alcohol with ethylene oxide 2 units), condensation products of alkylphenols and ethylene oxide (such as the reaction product of nonyl phenol with 4 units of ethylene oxide), and mixtures thereof. Ethoxylated fatty amines such as Witcamide® 511, betaine products and ethoxylated amine and mixtures thereof are also good candidates as emulsifying agents.

Generally, the inverse emulsion comprises between 0.1 and 10% by weight of emulsifying agent of the water-in-oil type relative to the total weight of the inverse emulsion.

Advantageously, the inverse emulsion can comprise stabilizing agents. Mention may be made, e.g., of: polyesters with a molecular weight of between 1000 and 3000 g/mol, condensation products between a poly(isobutenyl) succinic acid or the anhydride thereof and a polyethylene glycol, where water-soluble block polymers have a molecular weight of between 2500 and 3500 g/mol, such as e.g. those sold under the names Hypermer®.

Generally, the inverse emulsion comprises between 0.1 and 10% by weight of stabilizing agents relative to the total weight of the inverse emulsion.

The emulsifying agent of oil-in-water type is advantageously chosen from ethoxylated nonylphenols, preferably having 4 to 10 ethoxylations (that is to say preferably having a degree of ethoxylation ranging from 4 to 10); ethoxylated/propoxylated alcohols preferably having an ethoxylation/propoxylation comprising 12 to 25 carbon atoms; ethoxylated tridecyl alcohols; ethoxylated/propoxylated fatty alcohols; ethoxylated sorbitan esters (advantageously having 20 molar equivalents of ethylene oxide); polyethoxylated sorbitan laurate (advantageously having 20 molar equivalents of ethylene oxide); polyethoxylated castor oil (advantageously having 40 molar equivalents of ethylene oxide); decaethoxylated oleodecyl alcohol; heptaoxyethyl lauryl alcohol; polyethoxylated sorbitan monostearate (advantageously having 20 molar equivalents of ethylene oxide); polyethoxylated alkyl phenols (advantageously having 10 molar equivalents of ethylene oxide) cetyl ether; polyethylene oxide alkyl aryl ether; N-cetyl-N-ethyl morpholinium ethosulfate; sodium lauryl sulfate; the products of condensation of fatty alcohols with ethylene oxide (advantageously having 10 molar equivalents of ethylene oxide); the condensation products of alkylphenols and ethylene oxide (advantageously having 12 molar equivalents of ethylene oxide); condensation products of fatty amines with 5 or more molar equivalents of ethylene oxide (preferably 5 to 50 equivalents); ethoxylated tristyryl phenols; condensates of ethylene oxide with partially esterified polyhydric alcohols with fatty chains as well as the anhydrous forms thereof; amine oxides advantageously having alkyl polyglucosides; glucamide; phosphate esters; alkylbenzene sulfonic acids and the salts thereof; and surfactant water-soluble polymers. The oil-in-water emulsifier can also be a mixture of one or more of the oil-in-water emulsifiers. The alkyl groups of said emulsifiers of the oil-in-water type refer to linear or branched groups, advantageously having 1 to 20 carbon atoms, more advantageously 3 to 15 carbon atoms. Furthermore, the aryls of these oil-in-water emulsifying agents advantageously comprise 6 to 20 carbon atoms, more advantageously 6 to 12 carbon atoms and mixtures thereof.

Generally the inverse emulsion contains between 0.01 and 10% by weight of emulsifying agent of the oil-in-water type relative to the total weight of the inverse emulsion.

Generally, the concentration of polymeric micro-gel in the inverse emulsion is between 5 and 65%, preferably between 20 and 50%, relative to the total weight of the inverse emulsion.

The polymerization of the monomer(s) is a radical polymerization. By radical polymerization, we include polymerization using UV photoinitiators, azo, redox or thermal initiators.

The polymerization initiators advantageously used can be chosen from compounds which dissociate into radicals under the polymerization conditions, e.g.: organic peroxides, hydroperoxides, hydrogen peroxide, persulfates, azo compounds and redox catalysts. The use of water-soluble initiators is preferred. In some cases, it is advantageous to use mixtures of various polymerization initiators, e.g. mixtures of redox catalysts and azo compounds.

In a preferred embodiment of the invention, the polymeric micro-gel is prepared by polymerization of monomer(s) in inverse microemulsion.

The method of preparation by inverse microemulsion can be like same described in the document "*Application of the cohesive energy ratio concept (CER) to the formation of polymerizable microemulsions*", Volume 29, Issue 4, 1988, Pages 411-423, of C. Holtzscherer and F. Candau.

The goal is to reach the thermodynamic stability threshold of the ternary aqueous phase/lipophilic phase/surfactants. This would result in the formation of a transparent and fluid microemulsion.

Microemulsions can also be obtained by reducing, advantageously by supplying mechanical energy, the sizes of droplets of the hydrophilic phase of an emulsion down to a size of between 20 nm and 500 nm, preferably between 50 nm and 250 nm, more preferably between 80 nm and 150 nm.

The particle size (micro-gel size) corresponds to the size of the droplets of the hydrophilic phase of microemulsion. The micro-gel size is therefore between 20 nm and 500 nm, preferably between 50 nm and 250 nm, more preferably between 80 nm and 150 nm.

In general, the structured polymer of the micro-gel is saturated in water during its preparation, and cannot swell more than 20% in volume in the cementitious composition, preferentially not more than 10% in volume, more preferably it does not swell at all. For instance, when the micro-gel size is 100 nm after its preparation, its size does not exceed 120 nm in the cementitious composition, preferably no more than 110 nm and even more preferably it remains 100 nm.

If need be, a person skilled in the art can refer to document EP 2802936 to find out how to produce a microemulsion.

Generally, an inverse microemulsion contains between 5 and 65% by weight of structured polymer, preferably between 10 and 50% and even more preferably between 15 and 40%, relative to the total weight of the inverse microemulsion.

Generally, the inverse microemulsion has, during the polymerization, a weight ratio between the hydrophilic phase and the lipophilic phase, advantageously between 80/20 and 20/80, preferably between 70/30 and 30/70, more preferably between 60/40 and 40/60.

Advantageously, the emulsifying agent of the water-in-oil type comprised in the inverse microemulsion is chosen from sorbitan esters (e.g. sorbitan monooleate, sorbitan isostearate, sorbitan sesquioleate, sorbitan trioleate, or mixtures thereof), oleyl diethanolamide and mixtures thereof.

Generally, the inverse microemulsion comprises between 0.01 and 10% by weight of emulsifying agent of the water-in-oil type relative to the total weight of the inverse microemulsion, preferably between 0.1 and 5%.

Advantageously, the emulsifier of the oil-in-water type comprised in the inverse microemulsion is chosen from ethoxylated sorbitan esters such as ethoxylated sorbitan oleate with 20 moles of ethylene oxide, ethoxylated sorbitan hexaoleate, decaethoxylated oleocetyl alcohol, nonylphenol with 10 moles of ethylene oxide (10 EO), polyethoxylated sorbitan hexaoleates and mixtures thereof.

Generally, the inverse microemulsion comprises between 0.1 and 20% by weight of emulsifying agent of the oil-in-water type relative to the total weight of the inverse microemulsion, preferably between 0.5 and 15%.

According to the invention, the microemulsion droplets (hydrophilic phase) have a size of between 20 nm and 500 nm, preferably between 50 nm and 250 nm, more preferably between 80 nm and 150 nm.

By "size of the microemulsion droplets", is meant the mean size, in number, of the droplets. The size corresponds to the mean diameter measured, preferably with a laser measuring device using conventional techniques which form part of the knowledge of a person skilled in the art. A device of the Zetasizer Nano type from Malvern can be used.

Cementing Process

The present invention also relates to a cementing process which comprises the injection into an underground formation of a cementitious composition. In this process, the cementitious composition comprises a polymeric micro-gel which contains at least one structured polymer, where said structured polymer is obtained by polymerization of monomer(s) in inverse microemulsion.

In other words, and more specifically, the method according to the invention comprises the following steps:
Preparing a cementitious composition which comprises a polymeric micro-gel, wherein said polymeric micro-gel contains:
(i) at least one structured polymer, wherein said structured polymer is obtained by polymerization of monomer(s) in inverse microemulsion,
(ii) a cement,
(iii) water, and
(iv) optionally at least one cementing additive;
Injecting said cementitious composition into a borehole containing a casing which defines an annular space between the casing and the borehole, in order to carry out the cementing through the casing and/or in the annular space around the casing and/or in the open hole under the casing.

As indicated previously, one of the advantages of the invention compared to the products currently available is to be able to carry out the cementing irrespective of the temperature, while ensuring good performance, and without risk of cracks.

The micro-gel remains in the form of particles once it is injected in the borehole. It does not become soluble and does not solubilize. It remains insoluble and its size does not vary within the borehole more than 20% in volume, preferably not more than 10% in volume, more preferably it does not vary in the cementitious composition or within the borehole. For instance, when the micro-gel size is 100 nm after its preparation, its size does not exceed 120 nm in the cementitious composition and in the borehole, preferably no more than 110 nm and even more preferably it remains 100 nm.

The micro-gel does not hydrolyze within the borehole.

In general, the temperature within the borehole is at least of 50° C., preferably at least 70° C., more preferably at least 90° C. and even more preferably at least 100° C.

The invention and the resulting advantages will emerge better from the following non-limiting examples given in order to illustrate the invention.

Examples

A list of abbreviations used in the following examples is given below:
AMD: Acrylamide
ATBS: 2-acrylamido-2-methylpropane sulfonic acid
PVA: Polyvinyl alcohol
SB rubber: Styrene-butadiene rubber
MBA: Methylene bis acrylamide
MBS: Sodium metabisulfite Synthesis of Polymeric Micro-Gels by Inverse Emulsion Polymerization An aqueous phase is prepared with 680 g of ATBS.Na (sodium 2-acrylamido-2-methylpropane sulfonate, 50% by weight in water), 0.2 g of MBA and 0.2 g of Versenex 80.

An oily phase is prepared from 234.5 g of oil (Exxsol® D100 S) and 25 g of tall oil fatty acid diethanolamine as water-in-oil emulsifying agent.

The water phase is added to the oil phase while mixing to form an emulsion. Nitrogen is bubbled through the resulting dispersion for 30 minutes while the temperature is stabilized at 25° C., at which time 0.1 g of t-butyl hydroperoxide is added to the emulsion and 5 g of a solution containing 0.75 g of MBS is introduced into the dispersion at a rate of 0.1 milliliter per minute. The polymerization is carried out at a temperature between 38° C. and 42° C., for approximately 90 minutes. The residual monomers are trapped by introducing 5 g of a solution containing 0.3 g of MBS at a flow rate of 1.0 milliliter per minute. A water-in-oil polymer emulsion containing 20% by weight of polymer 1 is obtained.

Fifty grams of an oil-in-water emulsifier (Marlophen® NP 8, ethers of nonylphenol and polyethylene glycol 8 OE) are added to the water-in-oil polymer emulsion for the use of the emulsion (the percentages are expressed in weight relative to the weight of the inverse emulsion). A water-in-oil polymeric emulsion is obtained, which contains 34% by weight of polymer 1.

Synthesis of Polymeric Micro-Gels by Precipitation Polymerization

The reactor used for this polymerization is a 2 L jacketed stirred vessel equipped with a distillation column, a pH probe, a thermometer, a powerful stirrer, a bubbler nozzle of nitrogen and an inlet of ammonia gas.

Pure tert-butanol (2-methyl-2-propanol) in the amount of 1570 g and 65 g of water are initially introduced into the reactor. 112 g of acid ATBS are then added under stirring. The monomer is then completely neutralized by means of a flow of gaseous ammonia which is passed through the suspension until a pH of 8 is achieved. The introduction of ammonia is then stopped and 1.3 g of MBA is then added. The solution is then sprinkled with nitrogen for one hour while the temperature is brought to 55° C.

When the temperature has stabilized at 55° C., 1.6 g of dibenzoyl peroxide is added to the solution in order to initiate the reaction and to precipitate the polymer formed. After the temperature has stopped increasing, the solvent is evaporated under vacuum to directly obtain a dry powder which corresponds to polymer 2.

Synthesis of Polymeric Micro-Gels by Polymerization in Inverse Micro-Emulsion.

In a 1 L reactor, 440 g of ATBS (50% by weight in water) and 0.22 g of MBA are mixed. The pH of the solution is adjusted to 6.5 with a few drops of concentrated sulfuric acid. Four hundred and forty grams of isoparaffinic oil, 12.3 g of sorbitan oleate and 107.7 g of ethoxylated sorbitan hexaoleate are then introduced. The mixture is then stirred and becomes transparent and homogeneous. It is kept under stirring at 200 rpm for the time of degassing with nitrogen for 25 minutes. Concentrated cumene hydroperoxide is then introduced into the medium, and 1 mL of sodium metabisulfite (at 10% by weight in water) after that. The mixture is left under a nitrogen atmosphere for the polymerization time. The reaction is exothermic and the temperature rises to 50° C. in 1 minute. Once the polymerization is complete, 0.2 g of MBS (40% by weight in water) is added in order to remove the residual monomers. The product obtained is transparent and of low viscosity (24 cP) and corresponds to polymer 3.

Different polymers (4-7) are synthesized using the same method by varying different parameters (composition, size of polymeric micro-gels), as summarized in Table 2.

Preparation of the Cementitious Composition

A cementitious composition is prepared by mixing the elements summarized in Table 1 in a mixing bowl, with a capacity of 1 L and equipped with blades. The elements are added in 15 seconds at 4000 rpm, then stirred for 35 seconds at 12 000 rpm.

A retardant (sodium lignosulfonate) and a dispersant (sodium naphthalene sulfonate) were used in the formulation of the slag cement.

TABLE 1

Slag cement formulations (44%/cement means
44 parts in weight per 100 parts in weight of cement)
Formulation of the slag cement (1.9 g/cm$^3$)

| | |
|---|---|
| Cement grade G | 100% |
| Water | 44%/cement |
| Dispersant | 0.20%/cement |
| Retardant | 0.05%/cement |
| Anti-gas migration agent | 0.35-0.45%/cement |

As briefly described previously, the Static Gel Strength Analyzer (SGSA) uses acoustic attenuation to assess the gelling process of a cement slurry under defined temperature and pressure conditions. The equipment measures the static gel strength (SGS) and resistance to compression as a function of time. In other words, the equipment evaluates the gelation of the cement during its dehydration, which occurs after placing the slurry in the well. During this phase, the aim is to ensure that the setting time is as short as possible in order to prevent any gas migration through the cement column. It is considered that this time must be less than 45 minutes between the start of gelling (when the SGS reaches 100 lb/100 ft$^2$) and the end of the risk of gas migration (beyond 500 lb/100 ft$^2$). The transition periods measured during the examples below are therefore between 100 and 500 lb/100 ft$^2$. When the setting time is greater than 60 min, the test is stopped.

The equipment used is of the Chandler Engineering brand and in particular allows the fluid transition periods in the presence or absence of the anti-gas migration agent to be measured.

The conditioning of the cement slurries lasted 30 min at ambient temperature, at 70° C. or at 90° C., the pressure applied was 3,000 PSI. The formulation used is identical to that of Table 1 with 0.42% by weight of polymeric composition.

TABLE 2

Compositions illustrating the invention (INV) or a comparative test (CE)
(EMI: inverse emulsion; μ-EMI: inverse microemulsion; PP: precipitation)

| Polymers | Composition | | | Polymer dosage (wt %) | Particle size (nm) | Temperature ° C. | Transition period (min) |
| | ATBS (mol %) | AM (mol %) | Polymerization | | | | |
|---|---|---|---|---|---|---|---|
| Blank | — | — | — | — | — | 70 | >60 min |
| Polymer 1 (CE 1) | 100 | — | EMI | 0.42 | 1000 | 70 | 38 |
| Polymer 2 (CE 2) | 100 | — | PP | 0.42 | — | 70 | >60 min |
| Polymer 3 (INV) | 40 | 60 | μ-EMI | 0.42 | 100 | 70 | 28 |
| Polymer 4 | 100 | — | μ-EMI | 0.42 | 100 | 70 | 19 |

TABLE 2-continued

Compositions illustrating the invention (INV) or a comparative test (CE)
(EMI: inverse emulsion; μ-EMI: inverse microemulsion; PP: precipitation)

| Polymers | Composition ATBS (mol %) | AM (mol %) | Polymerization | Polymer dosage (wt %) | Particle size (nm) | Temperature ° C. | Transition period (min) |
|---|---|---|---|---|---|---|---|
| Polymer 5 (INV) | 100 | — | μ-EMI | 0.42 | 600 | 70 | 37 |
| Polymer 6 (CE 3) | 100 | — | μ-EMI | 0.42 | 500 | 70 | 29 |
| Polymer 7 (INV) | 100 | — | μ-EMI | 0.42 | 100 | 90 | 17 |
| SBR latex (CE 4) | — | — | — | 0.42 | — | 70 | >60 min |
| SBR latex (CE 5) | — | — | — | 2.0 | — | 70 | >60 min |
| SBR latex (CE 6) | — | — | — | 3.2 | — | 70 | 37 |
| PVOH latex (CE 7) | — | — | — | 2.0 | — | 70 | 40 |
| PVOH latex (CE 8) | — | — | — | 3.2 | — | 90 | >60 min |

In Table 2, the particle size corresponds to the size of the droplets of the hydrophilic phase in the emulsion or microemulsion.

The structured polymers, and therefore the micro-gels, obtained by inverse microemulsion (polymers 3-4 and 6-7) show better performance than those obtained by another synthetic route (polymers 1 and 2). They afford a shorter transition period as compared to micro-gels obtained from microemulsion having hydrophilic phase droplets of more than 500 nm (polymers 4 and 6 vs polymers 1 and 5).

The concentration of the polymers of the invention is considerably reduced and it is necessary to multiply the quantity of SBR rubber by more than 7.5 times to obtain performance that is not even equivalent to the micro-gels of the invention (polymer 6 compared to the counter-example CE 6), and by more than 4.5 for PVOH latex compounds (polymer 5 compared to counter-example CE 7).

PVOH latex compounds exhibit a lack of performance for temperatures above 90° C., even at high concentration, whereas the micro-gels of the invention function regardless of the temperature.

The invention claimed is:

1. A cementitious composition which contains:
    a polymeric micro-gel;
    a cement; and
    water;
    wherein the polymeric micro-gel contains at least a polymer structured by at least one crosslinking agent,
    wherein the structured polymer is obtained by polymerization in an inverse microemulsion of: at least one anionic monomer; or at least one anionic monomer and at least one nonionic monomer,
    wherein the at least one anionic monomer has a functional group chosen from acrylic, maleic, fumaric, malonic, itaconic and allylic functional groups,
    wherein, when present, the at least one non-ionic monomer is chosen from the group consisting of acrylamide, methacrylamide, N-isopropylacrylamide, N,N-dimethylacrylamide, N,N-diethylacrylamide, N-methylolacrylamide, N-vinylformamide (NVF), N-vinyl acetamide, N-vinylpyridine and N-vinylpyrrolidone (NVP), N-vinyl imidazole, N-vinyl caprolactame, N-vinyl succinimide, acryloyl morpholine (ACMO), acryloyl chloride, glycidyl methacrylate, glyceryl methacrylate, diacetone acrylamide, hydroxyalkyl (meth)acrylates with an alkyl in $C_1$-$C_3$, aminoalkyl (meth)acrylates with an alkyl in $C_1$-$C_3$, thioalkyl (meth)acrylates with an alkyl in $C_1$-$C_3$ and mixtures thereof, and
    wherein the microemulsion comprises droplets of a hydrophilic phase with a size of between 20 and 500 nm.

2. A cementitious composition according to claim 1, characterized in that the anionic monomer is 2-acrylamido-2-methylpropane sulfonic acid and/or its salified form.

3. A cementitious composition according to claim 2, characterized in that the structured polymer comprises at least 30 mol % of at least one anionic monomer.

4. A cementitious composition according to claim 3, characterized in that the crosslinking agent is a monomer which has at least two unsaturated olefin type bonds.

5. A cementitious composition according to claim 2, characterized in that the crosslinking agent is a monomer which has at least two unsaturated olefin type bonds.

6. A cementitious composition according to claim 5, characterized in that the structured polymer comprises less than 5% by weight of crosslinking agent, relative to the weight of monomers.

7. A cementitious composition according to claim 6, characterized in that the cementitious composition comprises between 100 and 100,000 ppm by weight of polymeric micro-gel.

8. A cementing process which comprises the following steps:
    preparing a cementitious composition according to claim 7;
    injecting said cementitious composition into a borehole containing a casing which defines an annular space between the casing and the borehole, in order to carry out the cementing through the casing and/or in the annular space around the casing and/or in the open hole under the casing.

9. A cementitious composition according to claim 2, characterized in that the structured polymer comprises less than 5% by weight of crosslinking agent, relative to the weight of monomers.

10. A cementitious composition according to claim 1, characterized in that the structured polymer comprises at least 30 mol % of at least one anionic monomer.

11. A cementitious composition according to claim 1, characterized in that the crosslinking agent is a monomer which has at least two unsaturated olefin type bonds.

12. A cementitious composition according to claim 1, characterized in that the structured polymer comprises less than 5% by weight of crosslinking agent, relative to the weight of monomers.

13. A cementitious composition according to claim 1, characterized in that the cementitious composition comprises between 100 and 100,000 ppm by weight of polymeric micro-gel.

14. A cementing process which comprises the following steps:
preparing a cementitious composition according to claim 1;
injecting said cementitious composition into a borehole containing a casing which defines an annular space between the casing and the borehole, in order to carry out the cementing through the casing and/or in the annular space around the casing and/or in the open hole under the casing.

15. A preparation method for a cementitious composition according to claim 1, which comprises mixing the following compounds:
a polymeric micro-gel;
a cement; and
water;
wherein the polymeric micro-gel contains at least one polymer structured by at least one crosslinking agent,
wherein the structured polymer is obtained by polymerization in an inverse microemulsion of at least one monomer,
wherein the microemulsion comprises droplets of a hydrophilic phase with a size of between 20 and 500 nm.

16. A cementitious composition according to claim 1, characterized in that the anionic monomer is selected from the group consisting of acrylic acid, methacrylic acid, itaconic acid, crotonic acid, maleic acid, fumaric acid, acrylamido undecanoic acid, 3-acrylamido 3-methylbutanoic acid, maleic anhydride, 2-acrylamido-2-methylpropane sulfonic acid, vinylsulfonic acid, vinylphosphonic acid, allylsulfonic acid, methallylsulfonic acid, 2-sulfoethylmethacrylate, sulfopropylmethacrylate, sulfopropylacrylate, allylphosphonic acid, styrenesulfonic acid, 2-acrylamido-2-methylpropanedisulfonic acid, salts and mixtures thereof.

17. A cementitious composition which contains:
a polymeric micro-gel;
a cement; and
water;
wherein the polymeric micro-gel contains at least a polymer structured by at least one crosslinking agent,
wherein the structured polymer is obtained by polymerization in an inverse microemulsion of: at least one anionic monomer; or at least one anionic monomer and at least one nonionic monomer,
wherein, apart from the at least one crosslinking agent, monomers polymerized to form the structured polymer are selected from the group consisting of:
one or more one anionic monomer having a functional group chosen from acrylic, maleic, fumaric, malonic, itaconic and allylic functional groups; and
optionally, one or more non-ionic monomer chosen from the group consisting of acrylamide, methacrylamide, N-isopropylacrylamide, N,N-dimethylacrylamide, N,N-diethylacrylamide, N-methylolacrylamide, N-vinylformamide (NVF), N-vinyl acetamide, N-vinylpyridine and N-vinylpyrrolidone (NVP), N-vinyl imidazole, N-vinyl caprolactame, N-vinyl succinimide, acryloyl morpholine (ACMO), acryloyl chloride, glycidyl methacrylate, glyceryl methacrylate, diacetone acrylamide, hydroxyalkyl (meth)acrylates with an alkyl in $C_1$-$C_3$, aminoalkyl (meth)acrylates with an alkyl in $C_1$-$C_3$, thioalkyl (meth)acrylates with an alkyl in $C_1$-$C_3$ and mixtures thereof,
wherein the microemulsion comprises droplets of a hydrophilic phase with a size of between 20 and 500 nm.

* * * * *